United States Patent [19]

Bones et al.

[11] Patent Number: 5,219,682
[45] Date of Patent: Jun. 15, 1993

[54] METHOD OF MAKING A SOLID ELECTROLYTE SEPARATOR

[75] Inventors: Roger J. Bones, Abingdon; Ivor E. Denton, Wantage, both of England

[73] Assignee: Programme 3 Patent Holdings, Luxembourg

[21] Appl. No.: 699,814

[22] Filed: May 8, 1991

[51] Int. Cl.$^5$ .............................................. H01M 6/18
[52] U.S. Cl. .................................. 429/193; 29/623.5; 264/65
[58] Field of Search .................... 429/193, 191, 30, 33, 429/104; 264/41, 65; 29/623.5

[56] References Cited

U.S. PATENT DOCUMENTS

| | | |
|---|---|---|
| 3,901,733 | 8/1975 | Toy et al. . |
| 4,401,215 | 8/1977 | Kormanyos et al. . |
| 4,722,875 | 2/1988 | Wright . |
| 4,732,741 | 3/1988 | Duncan et al. . |
| 4,797,332 | 1/1989 | Barrow et al. . |
| 4,910,105 | 3/1990 | Tilley et al. . |
| 4,925,749 | 5/1990 | Wright ................................. 429/104 |

FOREIGN PATENT DOCUMENTS

| | | |
|---|---|---|
| 0399786A2 | 11/1990 | European Pat. Off. . |
| 1050694 | 12/1966 | Fed. Rep. of Germany . |
| 1274211 | 5/1972 | United Kingdom . |
| 1424879 | 2/1976 | United Kingdom . |
| 2082379A | 3/1982 | United Kingdom . |
| 2114114A | 8/1983 | United Kingdom . |
| 2213310 | 8/1989 | United Kingdom . |

*Primary Examiner*—Anthony Skapars
*Attorney, Agent, or Firm*—Arnold, White & Durkee

[57] ABSTRACT

The invention provides a solid electrolyte separator for separating two electrodes from each other in an electrochemical cell. The separator is of composite layered construction and comprises at least one porous layer of solid electrolyte material having a plurality of interconnected channels or pores in its interior and opening out of its surface, and a dense layer of non-porous solid electrolyte material. The layers are integrally bonded together, face-to-face, and each porous layer is an outer layer of the separator.

9 Claims, No Drawings

METHOD OF MAKING A SOLID ELECTROLYTE SEPARATOR

This invention relates to a solid electrolyte separator for an electrochemical cell. The invention also relates to a method of making a solid electrolyte separator for an electrochemical cell.

According to the invention there is provided a solid electrolyte separator for separating two electrodes from each other in an electrochemical cell, the separator being of composite layered construction and comprising at least one porous layer of solid electrolyte material having a plurality of interconnected channels or pores in its interior and opening out of its surface, and a dense layer of non-porous solid electrolyte material, the layers being integrally bonded together, face-to-face, and each porous layer being an outer layer of the separator.

Typically the separator will be used for separating a molten alkali metal anode from a cathode and molten salt electrolyte in a high temperature electrochemical power storage cell, although, in principle, it can be used in a fuel cell, eg when the separator is a conductor of hydronium ions.

The pores or channels may have a size of 10–400 $\mu$m, each porous layer having a thickness of 200–2,000 $\mu$m, the dense layer having a thickness of 100–2,000 $\mu$m, and each porous layer having an open porosity as defined herein of 20–80%. The electrolyte will typically be a conductor of sodium ions, the separator having a said porous layer whose open pores are treated with a wetting agent for enhancing wettability thereof by molten sodium.

As each porous layer must be an outer layer, the separator will typically have either two layers, one of which is dense and the other of which is porous, or three layers, namely a dense central layer sandwiched between two porous outer layers.

Further according to the invention there is provided a method of making a solid electrolyte separator for separating a molten alkali metal anode from a molten salt electrolyte in a high temperature electrochemical power storage cell, the method comprising the steps of:

forming a composite layered artifact comprising at least two layers of solid electrolyte material or a precursor thereof arranged face-to-face, at least one of said layers being capable of providing, after sintering, a dense non-porous sintered layer, at least one of said layers being an outer layer capable of providing, after sintering, a porous sintered layer comprising a plurality of interconnected channels or pores, and at at least one of each adjacent pair of said layers being a green layer capable of being sintered to form a sintered layer; and heating said composite artifact to a temperature at which each green layer becomes a sintered layer and it becomes integrally bonded to each adjacent layer, to form a unitary sintered artifact.

The composite layered artifact may thus be made up of, for example, one or two sintered layers and one or two green layers, or two or three green layers. When one or two sintered layers are employed they may be prefabricated porous layers which retain their porosity after sintering, or they may be dense prefabricated layers. Thus, a number of combinations are possible, subject to the constraints that there must be at least one dense layer after sintering, there must be at least one outer porous layer after sintering, and at least one of each adjacent pair of layers must be a green layer, so that the sintering bonds each adjacent pair of layers together, face-to-face. Preferably, however, each layer of said composite artifact is a said green layer which is capable of providing, after sintering, a porous sintered layer, containing a pore-forming material which is driven therefrom by the heating to leave said interconnected pores or channels. This feature promotes achieving intimate face-to-face contact between layers by pressing as described hereunder, and requires a single sintering step, in contrast to using one or more prefabricated sintered layers.

The pore-forming material may be selected from the group consisting of granular particles, fibrous particles, felts and textiles; and the pore-forming material may more particularly be selected from the group consisting of carbon and materials which carbonize before burning when heated, the heating being under an oxygen-containing atmosphere and acting to burn away the pore-forming material.

In one embodiment of the invention, the method may include, prior to forming the composite layered artifact, formulating the material of each green layer to comprise a plastic mixture which contains said solid electrolyte material or a precursor thereof in particulate form, mixed with one or more binders which have both thermoplastic and thermosetting properties, forming the composite layered artifact being by pressing the layers together to deform each green layer into intimate face-to-face contact with each adjacent layer.

More particularly, according to this embodiment of the invention, the method may include the steps of:

formulating a batch of the solid electrolyte material or a precursor thereof mixed in particulate form with one or more binders which have both thermoplastic and thermosetting properties;

formulating a second batch of said mixture, combined together with at least one pore-forming material;

forming, from said batches, the composite artifact entirely in green form, the composite artifact comprising at least one layer of each batch in face-to-face contact, each layer which contains pore-forming material being an outer layer of the composite artifact; and heating the green artifact under an oxygen containing atmosphere to a temperature at which it becomes a unitary sintered artifact, the pore-forming material and proportion thereof used being selected so that, during the heating, it is converted by burning to gaseous products to leave, in each layer formed from the batch containing pore-forming material, a plurality of interconnected channels or pores, so that the sintered artifact comprises at least one porous outer layer formed from the batch containing pore-forming material and a dense layer formed from the other batch.

The batch containing the pore-forming material will typically be formed by doping the batch of mixture used for the dense layer with particulate pore-forming material, and heating will typically be in air. The particulate solid electrolyte material or its precursor preferably has a maximum particle size of 100 $\mu$m, and an average particle size of at most 70 $\mu$m, preferably 10–50 $\mu$m.

Usually, the separator will be a $\beta$-alumina, preferably $\beta''$-alumina, artifact, for use in cells in which the alkali metal anode is molten sodium. The invention will thus be described hereunder with reference to $\beta''$-alumina, but it should be understood that the invention applies equally to $\beta$-alumina separators and to separators made by sintering green artifacts made from particles of solid electrolyte material or precursors thereof other than β-alumina or β''-alumina, eg analogues of β''-alumina or β-alumina, glasses, combinations of the aforegoing, or the like.

It will be appreciated that, while the binder or binders used will be in liquid or solution form, eg dissolved in a suitable organic solvent, so that they evaporate during the initial stages of heating while the green artifact is plastic, to leave no pores, the pore-forming dopant will, in contrast, be a solid material, which is, without melting, burnt out of the green artifact when it has lost its plasticity to leave pores in the sintered product artifact. The pore-forming dopant may thus be carbon, such as graphite, or an organic, eg thermosetting, material which is carbonized before it is burnt out.

Forming the green artifact may be by pressing, rolling, extruding or the like. Thus, for example, a layer of material from the one batch may be applied to a layer of material from the other batch, optionally with the use of a suitable adhesive such as the solvent used for the binder. These layers, optionally in tape form, may then be pressed together, eg by rolling, to form a sheet which can then be fired to form a fired artifact in the form of a flat sintered solid electrolyte sheet. The sheet will usually have two layers, one of dense material and one of porous material, or it may have three layers, ie a dense layer sandwiched between porous layers. If desired, the layers, while green, may be rolled, so that a composite green artifact is obtained with corrugations of, for example, sinusoidal shape.

The layers may be adhesively secured together before they are pressed by rolling, and the layers may be rolled to provide them with corrugations before they are adhesively secured together, the heating and sintering taking place after they are adhesively secured together with the corrugations facing outwardly.

Instead, the green artifact may be tubular, being extruded from a plug of green material through an annular die. In this case the plug may have a core of material from the one batch within an outer cylindrical layer of material from the other batch or vice versa, so that a cylindrical green artifact is extruded with concentric layers respectively of the two materials.

It is contemplated, as indicated above, that the particle size of the dopant will be selected to form pores in the porous surface layer of at most 400 μm in size. The dopant may be relatively monosized to form monosized pores, or it may have a selected particle size distribution, to form pores of various sizes in a desired size distribution.

This dopant, as indicated above, may be carbon or graphite powder or grit, but instead may be in the form of balls or fibres of graphite or carbon, or of some other suitable organic material such as cellulose, which will be burnt out. Indeed, it may be possible to impregnate a graphite felt or textile with the green mixture for this purpose; or a slurry may be made of a doped batch containing particles or fibres, and painted on to a green artifact formed from the other batch. Accordingly, a second embodiment of the invention contemplates, prior to forming the composite layered artifact formulating the material of at least one green layer to comprise a paintable mixture which contains said solid electrolyte material or a precursor thereof in particulate form, forming the composite artifact comprising painting the paintable mixture on to an adjacent layer to form a green layer in the form of a painted coating on said adjacent layer. Indeed, if desired, the paint need contain no pore-forming material, being intended to form a dense layer, and the layer or artifact on which it is painted may be that which provides the porous layer, although, usually, the paint will contain the pore-forming material.

When the porous layer is intended, as it usually is, for contact with the alkali metal (eg sodium) anode of the cell, it may be treated with a wetting agent in its porous interior, such as lead acetate or manganese nitrate, for enhanced wettability by said alkali metal. Suitable methods of treatment to enhance wetting by sodium are described in the Applicant's U.S. Pat. No. 4,797,332.

Suitable thermoplastic and thermosetting binders are known for the purpose of the present invention, and are described for example in British Patent 1 274 211. As mentioned in this British Patent a single binder may be used, provided that it displays the required thermoplastic and thermosetting properties.

Thus, polyvinyl-butyral may be used as both a thermoplastic and thermosetting binder, together with a plasticizer such as dibutyl phthalate and a solvent such as methyl ethyl ketone, the solvent and plasticizer facilitating blending of the binder into the β-alumina powder to form a homogeneous mixture. If high energy mixing, as in a Banbury mixer, is employed, the plasticizer and solvent can in principle be omitted.

Forming the mixture into sheet material may also be as described in British Patent 1 274 211, eg by calendering, rolling or by a doctor blade technique. The sheet material may also be densified as described in British Patent 1 274 211, eg by roll-compacting or pressing, and rolling with corrugated rollers may be employed to corrugate the sheet or other artifact.

In accordance with the invention, the thickness of the dense and porous layers can, within limits, be varied to provide the artifact with desired ion-conducting, wicking and mechanical properties. When the porous layer is in contact with molten sodium in a cell, it will, particularly when treated with a wetting agent, relatively readily wick molten sodium into its interior; and the dense layer can be made relatively thin for low resistance to sodium ion migration therethrough. Thus, for example, an artifact can be made with a dense layer formed from a green layer 0.7-0.9 mm thick and a porous layer formed from a green layer 0.4 mm thick, for good mechanical strength; or an artifact can be made with a dense layer formed from a green layer 0.3 mm thick and a porous layer formed from a green layer which is say 1 mm thick for enhanced ion conductivity. These values are given by way of example, and it will be appreciated that substantial design flexibility is provided by the method, by varying the above parameters (thickness) and by varying pore size and porosity (total number and total volume of pores).

In tests carried out by the Applicant, batches of mixtures of solid electrolyte material were formulated in particulate form with binders, containing particulate pore-forming material. Two examples were tested, as follows:

EXAMPLES 1

A mixture was made of 500 g β-alumina powder, together with 112 g polyvinyl-butyral powder as a thermoplastic and thermosetting binder, 56 g of dibutyl phthalate as a plasticizer and 150 ml of methyl ethyl ketone as solvent. These constituents were thoroughly mixed until the methyl ethyl ketone evaporated, after which 100 g of graphite powder was added, and admixed by means of a ball mill, after which the mixture was calendered to a desired thickness in the form of a tape.

The tape was then sintered, and its shrinkage and porosity were measured. For tape having a thickness of 0.3 mm, shrinkages of 23.5% and 19.7% in directions normal to each other were noted, and for tape of 0.6 mm thickness, the shrinkage was 20.8% in both directions. The tapes of both thicknesses exhibited 25.49% open porosity, i.e. as open pores, and 0.71% closed porosity, i.e. as closed pores, in each case having a density of 73.9% of theoretically fully dense $\beta$-alumina.

By way of comparison, a similarly formed tape of a thickness of 0.8 mm but excluding the graphite powder, exhibited shrinkages in directions normal to each other of 18.0% and 16.2% respectively. In each case, where differential shrinkages were observed, the greater shrinkage was always in the longitudinal direction of the tape, i.e. the direction in which it moves when being calendered.

EXAMPLE 2

In this case a slurry was formed by mixing together 1000 g $\beta''$-alumina, 160 g of polyvinyl-butyral, 80 g of dibutyl phthalate and 900 ml methyl ethyl ketone. To this was admixed an amount of 544 g carbon balls having a diameter of somewhat less than 0.4 mm. Additional methyl ethyl ketone was then added until a creamy slurry was obtained. This slurry was then painted on to a tape formed from a mixture made in accordance with Example 1 but omitting the graphite powder, i.e. the tape used for comparison in Example 1 which was then dried and sintered. In this case, on the dense sintered material obtained from the tape after firing, a surface layer was obtained derived from the slurry, exhibiting 58% open porosity, and no closed porosity.

The aforegoing examples clearly demonstrate the feasibility of making the solid electrolyte separators of the present invention, in accordance with the method of the invention, and it should be noted that both for Example 1 and Example 2 the porous surface layer was tightly and integrally bonded to the associated dense layer.

Finally for the purpose of determining percentage open or closed porosity, it should be noted that each specimen was weighed dry in air, weighed in water with its open pores filled with water by vacuum impregnation and then weighed wet in air with its open pores still filled with water. From the results:

$$\% \text{ open porosity} = 100\left(1 - \frac{Wa}{Wc - Wb} \times \frac{Wa - Wb}{Wa \times D}\right)$$

$$\% \text{ closed porosity} = 100\left(1 - \frac{Wa}{(Wc - Wb)}\delta t\right)$$

in which:
Wa is the dry weight in air (g)
Wb is the weight immersed in water referred to above (g)
Wc is the wet weight in air referred to above (g)
D is the density of water (1g/ cm$^3$) $\delta t$ is the theoretical density of fully dense $\delta''$-alumina (3.26 g/cm$^3$).
We claim:

1. In the making of a solid electrolyte separator for separating a molten alkali metal anode from a molten salt electrolyte in a high temperature electrochemical power storage cell by:

forming a composite layered artifact comprising at least two layers of solid electrolyte material or a precursor thereof arranged face-to-face, at least one of said layers being capable of providing, after sintering, a dense non-porous sintered layer, at least one of said layers being an outer layer capable of providing, after sintering, a porous sintered layer comprising a plurality of interconnected channels or pores, and at least one of each adjacent pair of said layers being a green layer capable of being sintered to form a sintered layer; and heating said composite artifact to a temperature at which each green layer becomes a sintered layer and becomes integrally bonded to each adjacent layer, to form a unitary sintered artifact;

the improvement whereby at least one said outer layer which is capable of providing, after sintering, a porous sintered layer comprising a plurality of interconnected channels or pores is a said green layer which is capable of being sintered to form a sintered layer and contains a pore-forming material which is driven therefrom by the heating to leave said interconnected channels or pores, the pore-forming material being selected from the group consisting of carbon and materials which carbonize before burning when heated, the heating being under an oxygen-containing atmosphere and acting to burn away the pore-forming material.

2. A method as claimed in claim 1, in which each layer of said artifact is a green layer, each of said layers which is capable of providing, after sintering, a porous sintered layer, containing said pore-forming material.

3. A method as claimed in claim 2, in which the pore-forming material is selected from the group consisting of granular particles, fibrous particles, felts and textiles.

4. A method as claimed in claim 1, which includes, prior to forming the composite layered artifact, formulating the material of each green layer to comprise a plastic mixture which contains said solid electrolyte material or a precursor thereof in particulate form, mixed with one or more binders which have both thermoplastic and thermosetting properties, forming the composite layered artifact being by pressing the layers together to deform each green layer into intimate face-to-face contact with each adjacent layer.

5. A method as claimed claim 1, which includes, prior to forming the composite layered artifact, formulating the material of at least one green layer to comprise a paintable mixture which contains said solid electrolyte material or a precursor thereof in particulate form, forming the composite artifact including painting the paintable mixture on to an adjacent layer to form a green layer in the form of a painted coating on said adjacent layer.

6. A solid electrolyte separator for separating a molten alkali metal anode from a molten salt electrolyte in a high temperature electrochemical power storage cell,, whenever made in accordance with a method as claimed in claim 1.

7. A method as claimed in claim 4, in which formulating the material of each green layer is such that it comprises a solvent wherein each binder is soluble.

8. A method as claimed in claim 5, in which formulating the material of said green layer is such that it comprises one or more binders which have both thermoplastic and thermosetting properties, and at least one solvent in which each binder is soluble.

9. In the making of a solid electrolyte separator for separating a molten alkali metal anode from a molten salt electrolyte in a high temperature electrochemical power storage cell by:

forming a composite layered artifact comprising at least two layers of solid electrolyte material or a precursor thereof arranged face-to-face, at least one of said layers being capable of providing, after sintering, a dense non-porous sintered layer, at least one of said layers being an outer layer capable of providing, after sintering, a porous sintered layer comprising a plurality of interconnected channels or pores, and at least one of each adjacent pair of said layers being a green layer capable of being sintered to form a sintered layer; and heating said composite artifact to a temperature at which each green layer becomes a sintered layer and becomes integrally bonded to each adjacent layer, to form a unitary sintered artifact;

the improvement whereby at least one said outer layer which is capable of providing, after sintering, a porous sintered layer comprising a plurality of interconnected channels or pores is a said green layer which is capable of being sintered to form a sintered layer and contains a pore-forming material which is driven therefrom by the heating to leave said interconnected channels or pores, the pore-forming material being selected from the group consisting of fibrous particles, felts and textiles.

* * * * *